United States Patent
Yaussy et al.

(10) Patent No.: US 8,560,730 B2
(45) Date of Patent: Oct. 15, 2013

(54) TRANSFER OF CONTACT DATA TO A NAVIGATION DEVICE

(75) Inventors: Ledley (Buddy) Yaussy, Duluth, GA (US); Akbar Pirani, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 743 days.

(21) Appl. No.: 12/130,649

(22) Filed: May 30, 2008

(65) Prior Publication Data
US 2009/0300219 A1   Dec. 3, 2009

(51) Int. Cl.
G06F 15/16 (2006.01)
G06F 15/167 (2006.01)
H04N 7/18 (2006.01)
H04N 7/173 (2011.01)

(52) U.S. Cl.
USPC .............. 709/246; 709/217; 725/75; 725/109

(58) Field of Classification Search
USPC .......... 709/217–219, 246, 249; 701/200–217; 209/246
See application file for complete search history.

(56) References Cited

U.S. PATENT DOCUMENTS

| | | | | |
|---|---|---|---|---|
| 5,774,825 A * | 6/1998 | Reynolds | ...................... | 725/105 |
| 5,794,174 A * | 8/1998 | Janky et al. | .................... | 725/111 |
| 6,526,460 B1 * | 2/2003 | Dauner et al. | ................ | 709/246 |
| 6,563,418 B1 * | 5/2003 | Moon | .......................... | 370/475 |
| 6,711,379 B1 * | 3/2004 | Owa et al. | .................... | 455/3.01 |
| 6,823,260 B1 * | 11/2004 | Turcotte | ....................... | 701/207 |
| 6,865,476 B1 | 3/2005 | Jokerst, Sr. | | |
| 7,054,745 B1 | 5/2006 | Couckuyt et al. | | |
| 7,256,711 B2 | 8/2007 | Sheha et al. | | |
| 7,783,316 B1 * | 8/2010 | Mitchell | ....................... | 370/330 |
| 2002/0143930 A1 * | 10/2002 | Babu et al. | ..................... | 709/224 |
| 2002/0156864 A1 * | 10/2002 | Kniest | .......................... | 709/217 |
| 2002/0199196 A1 * | 12/2002 | Rabinowitz et al. | ........... | 725/72 |
| 2003/0023978 A1 * | 1/2003 | Bajgrowicz | ..................... | 725/68 |
| 2003/0192053 A1 * | 10/2003 | Sheppard et al. | ............... | 725/81 |
| 2004/0030493 A1 * | 2/2004 | Pechatnikov et al. | ......... | 709/219 |
| 2004/0083493 A1 * | 4/2004 | Swisher et al. | ............... | 725/106 |
| 2004/0214556 A1 * | 10/2004 | Yamada | ........................ | 709/217 |
| 2005/0262220 A1 * | 11/2005 | Ecklund et al. | ............... | 709/219 |
| 2006/0015912 A1 * | 1/2006 | Itabashi | .......................... | 725/75 |
| 2006/0039367 A1 * | 2/2006 | Wright et al. | .................. | 370/382 |
| 2006/0184969 A1 * | 8/2006 | Yamamoto et al. | ............ | 725/58 |
| 2007/0157257 A1 * | 7/2007 | Kagan et al. | .................... | 725/75 |
| 2007/0287498 A1 * | 12/2007 | Wang et al. | ................. | 455/556.1 |
| 2007/0297343 A1 * | 12/2007 | Furutani | ....................... | 370/252 |
| 2007/0297454 A1 * | 12/2007 | Brothers | ....................... | 370/486 |
| 2007/0299983 A1 * | 12/2007 | Brothers | ....................... | 709/231 |
| 2008/0089288 A1 * | 4/2008 | Anschutz et al. | ............. | 370/331 |
| 2008/0195978 A1 * | 8/2008 | Wissenbach et al. | ......... | 715/854 |
| 2008/0281510 A1 * | 11/2008 | Shahine | ....................... | 701/207 |
| 2009/0083804 A1 * | 3/2009 | Gat et al. | ........................ | 725/62 |
| 2009/0234570 A1 * | 9/2009 | Sever | ............................. | 701/200 |
| 2009/0254599 A1 * | 10/2009 | Lee et al. | ..................... | 709/201 |

* cited by examiner

Primary Examiner — Ian N Moore
Assistant Examiner — Jenee Alexander
(74) Attorney, Agent, or Firm — Cantor Colburn LLP

(57) ABSTRACT

Various methods, apparatuses, and computer program products are provided. One example includes a method for transferring location information. Location information is received via a network. The location information is parsed. It is determined whether the location information is in a proper format for a navigation device. In response to determining that the location information is not in the proper format, the location information is converted into the proper format for the navigation device. The location information is transmitted to the navigation device via another network, and the navigation device is capable of receiving communications over the other network.

19 Claims, 8 Drawing Sheets

TRANSFER OF CONTACT DATA TO A NAVIGATION DEVICE

BACKGROUND

Exemplary embodiments relate to the field of network communication transmissions, and particularly to the field of network communication transmissions within networks that support Internet protocol television services.

Internet protocol television (IPTV) service is a digital television delivery service, wherein the digital television signal is delivered to residential users via a computer network infrastructure using the Internet Protocol. Typically, IPTV services are bundled with additional Internet services, such as Internet web access and voice over Internet protocol (VoIP). Subscribers and users of subscriber devices receive IPTV services via a set top box that is connected to a television or display device for the reception of a digital signal. Used in conjunction with an IP-based platform, the set top box allows for a subscriber or other user to access IPTV services and any additional services that are integrated within the IPTV service.

IPTV service platforms allow for an increase in the interactive services that can be provided to residential subscribers/users. As such, a subscriber/user can have access to a wide variety of content that is available via the IPTV service or the Internet. The IPTV infrastructure also allows the delivery of a variety of video content instantly to the subscribers/users.

It is desirable to provide access to various services, and particularly to provide access to various services using an IPTV infrastructure.

BRIEF SUMMARY

Exemplary embodiments include a method for transferring location information. Location information is received via a network. The location information is parsed, and a determination is made whether the location information is in a proper format for a navigation device. In response to determining that the location information is not in the proper format, the location information is converted into the proper format for the navigation device. The location information is transmitted to the navigation device via another network, and the navigation device is capable of receiving communications over the other network.

Exemplary embodiments include an intermediary device for transferring location information to a navigation device. The intermediary device includes memory for storing a conversion application and an input and output (I/O) component for respectively receiving and transmitting communications. The intermediary device also includes a processor, functionally coupled to the memory, and the processor is responsive to computer-executable instructions contained in the conversion application and operative to execute the instructions. Location information received by the intermediary device is parsed, and a determination is made whether the location information received by the intermediary device is in a proper format for a navigation device. In response to the location information not being in the proper format, the location information is converted into the proper format for the navigation device. Also, the intermediary device receives the location information via a network, is operatively connected to the navigation device via another network or a direct connection, and transfers the location information to the navigation device via the other network or the direct connection.

Additional exemplary embodiments include a method for transferring location information using an intermediary device. Location information is received by an intermediary device from a communication device via a first network. The location information is parsed, and a determination is made whether the location information is in a proper format for a navigation device. In response to the determining that the location information is not in the proper format, the location information is converted into the proper format for the navigation device. The location information is transmitted to the navigation device from the intermediary device via a second network or a direct connection.

Further exemplary embodiments include a method of synchronizing a networked address book for transfer to a navigation device. A networked address book is retrieved. Entries of the networked address book are parsed to determine if data of the networked address book is in a proper format for a navigation device. Entries of the networked address book are converted to the proper format, in response to determining that the entries are not in the proper format. Entries of the networked address book are transferred to the navigation device.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
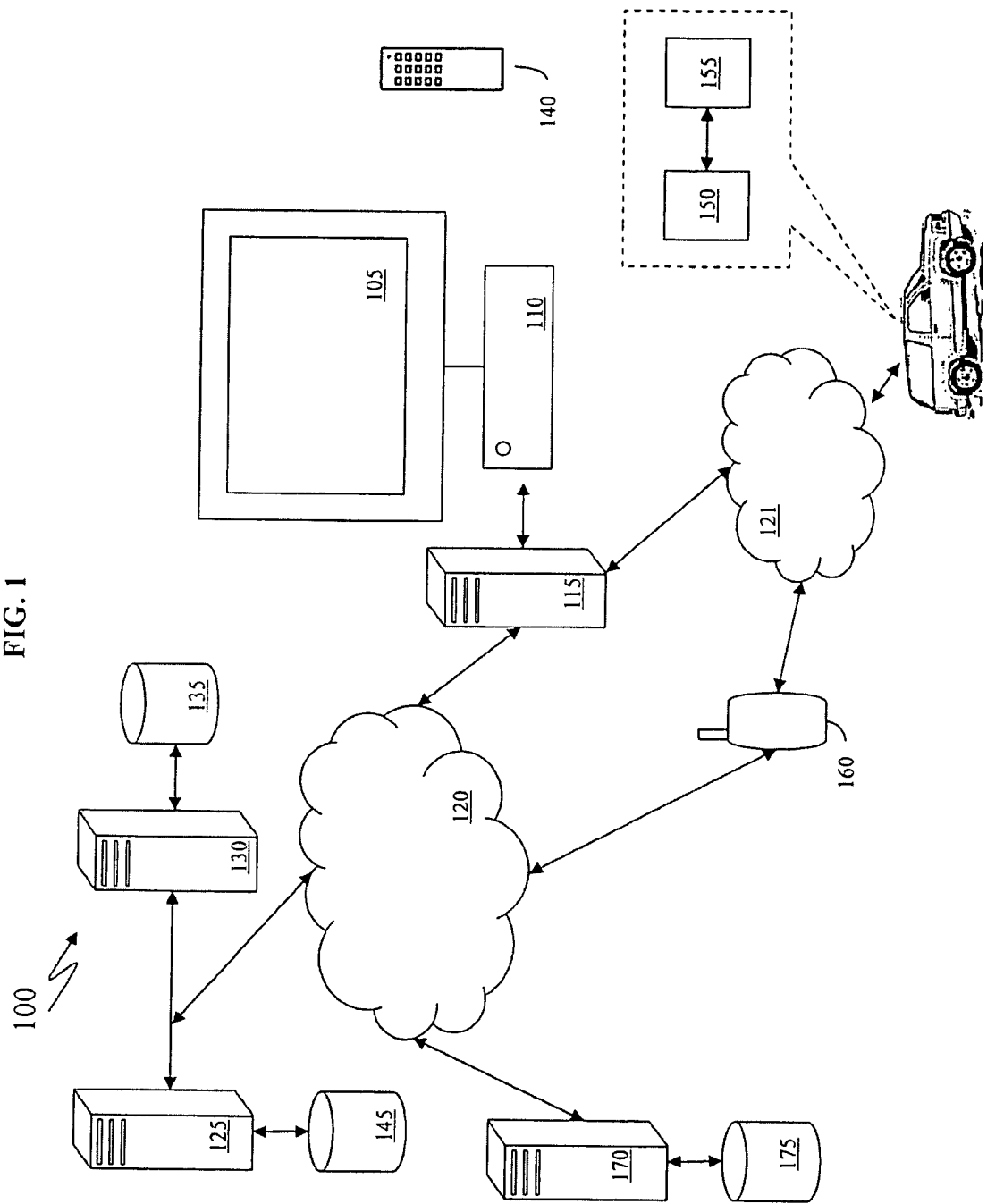
FIG. 1 illustrates a block diagram of a system in accordance with exemplary embodiments.

FIG. 1 illustrates a block diagram of a system 100 in accordance with exemplary embodiments. The system 100 provides an infrastructure through which users can access media (including video, audio, data, multimedia messaging, waypoints, etc.) through a communications device 105, such as an IPTV enabled television and a computing device 110, such as a set top box, configuration or any other type communication device. Although shown as separate devices, the communications device 105 and the set top box 110 may be integrated into one device. As an IPTV network, the system 100 also includes a remote controller 140 for inputting information and controlling the communications device 105 (e.g., a television). It is understood that in exemplary embodiments and implementations, the communications device 105 can be a variety of other communications devices such as general purpose or laptop computers, wireless devices such as cellular telephones, portable computing device, digital music players (e.g., MP3 players), mobile devices, digital televisions, etc. In addition, a wireline public switched telephone network (PSTN) telephone, session initiation protocol (SIP) telephone, dual-mode mobile telephone, personal digital assistant (PDA), or other type of communications device may be included in the system 100 of FIG. 1.

According to exemplary embodiments, the system 100 includes the communications device 105 as discussed above, which can be an IP enabled television communicatively coupled to the set top box 110, which in turn may be communicatively coupled to a server 115 for accessing networks 120, 121 such as but not limited to the Internet. It is understood that the server 115 (e.g., a residential gateway) may be omitted and the communications device 105 may directly access the networks 120, 121. Furthermore, residential gateways, such as a DSL modem, may be used to access the networks 120, 121. Indeed, access to the networks 120, 121 is not meant to be limited in any way. The networks 120, 121 may include circuit-switched and/or packet-switched technologies and devices, such as routers, switches, hubs, gateways, etc., for facilitating communications between the communications device 105 and servers 125, 130, 170. The networks 120, 121 may include wireline and/or wireless components utilizing, e.g., IEEE 802.11 standards for providing over-the-air transmissions of communications. The networks 120, 121 can be IP-based networks for communication between a customer service center and clients/users using the communication device 105 via a broadband connection.

Also, the networks 120, 121 may include wireline and/or wireless components utilizing standards for, e.g., multimedia messaging services (MMS). The networks 120, 121 may include a multimedia messaging center (MMC), which implements the network side of multimedia messaging service (MMS) and makes it possible for an operator to offer multimedia messaging to mobile communication device users. The MMC is a highly flexible system, which can be adapted to the needs of the operator and the particular end users involved. The MMC manages different sources to/from mobile terminals, such as a mobile device 160 and a communication vehicle device 150, supporting a wide range of standard interfaces.

In accordance with exemplary embodiments, the networks 120 and 121 may be the same or different networks, and may have the same or different capabilities. Additionally, the networks 120 and 121 can be representative of countless networks.

According to exemplary embodiments, the networks 120, 121 facilitate transmission of media (e.g., images, video, data, maps, waypoints, multimedia messaging, etc.) from content services provider systems to customers/users via devices, such as the communications device 105, the mobile device 160, and the communication vehicle device 150, through a broadband connection. As discussed above, the network 121 may or may not be the same as the network 120. If the networks 120 and 121 are different in exemplary embodiments, the communication vehicle device 150 may be in communication with the communication device 105 and the mobile device 160 via the network 121. The communication vehicle device 150 may be a mobile device capable of being used in a vehicle.

In accordance with exemplary embodiments, the communication vehicle device 150 may be operatively connected to a positioning and/or guidance system 155. Conversely, in exemplary embodiments, the positioning and/or guidance system 155 may be operatively connected to the network 121 (or the network 120), and the communication vehicle device 150 may be omitted.

In exemplary embodiments, the networks 120, 121 can be a managed IP network administered by a service provider, which can control bandwidth and quality of service for the communications discussed herein. The networks 120, 121 may be implemented in a wireless fashion, e.g., using wireless protocols and technologies, such as WiFi, WiMax, BLUETOOTH, etc. Either or both of the networks 120, 121 can also be a packet-switched network as a local area network, a wide area network, a metropolitan area network, an Internet network, or other similar types of networks. Either of both of the networks 120, 121 may be a cellular communications network, a fixed wireless network, a wireless local area network (LAN), a wireless wide area network (WAN), a personal area network (PAN), a virtual private network (VPN), an intranet or any other suitable network, and the networks 120, 121 may each include equipment for receiving and transmitting signals, such as a cell tower, a mobile switching center, a base station, and a wireless access point.

The system 100 can manage multiple accounts as established by particular users (e.g., by using the server 125). These accounts may then be used to provide access to media services as described further herein.

As further shown in FIG. 1, the server 125 (e.g., a host server) may be in communication with the server 130 (e.g., an authentication server) and communications device 105 via the network 120. The server 125 (such as a media server, back-end server, or networked address book server) may be implemented using a high-speed processing device (e.g., a computer system) that is capable of handling high volume activities conducted via the communications device 105 and other network entities. According to exemplary embodiments, the server 130 may receive requests from the communications device 105 to access network services (e.g., to access a webpage). The server 125 may be implemented by a network service provider, a content service provider, a media service provider, a MMC, a webpage provider, a networked address book provider, or another enterprise. Similarly, the server 130 may be implemented using a high-speed processing device (e.g., a computer system) that is capable of handling high volume activities conducted via the communications device 105, and other network entities via the network 120. As a non-limiting example, the server 130 (e.g., as an authentication server) may receive requests from the communications device 105 either to establish a media services account or to access network services (e.g., to access media). As an authentication server, the server 130 may implement authentication software for restricting or controlling access to network services provided by the server 125 (or another server). The server 130 may be in communication with a storage database 135, such as a customer identity system (CIS) database, which stores user credentials (e.g., user names and passwords). In another exemplary embodiment, user credentials can be stored on the communications device 105.

In exemplary embodiments, the user can establish an account using devices associated with the user. For example, the communications device 105 can enable the establishment of an account that is managed by the provider enterprise of the server 125. As such, the communications device 105 may receive Internet services from the provider enterprise of the server 125, and an account record may be generated for the user of the communications device 105 that identifies the user and the account for which the services are provided. Account information and records may be stored in a storage device accessible by the server 125, such as a storage device 145.

Furthermore, exemplary embodiments are not limited to but are capable of being implemented in the system 100 illustrated in FIG. 1. Additionally, the servers 115, 125, 130, and 170 may be representative of numerous servers. Storages devices, such as the storage device 135, 145, and a storage device 175 may be representative of numerous storages devices. Likewise, the networks 120 and 121 may be representative of numerous networks. Therefore, the system 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1.

Figure 2:
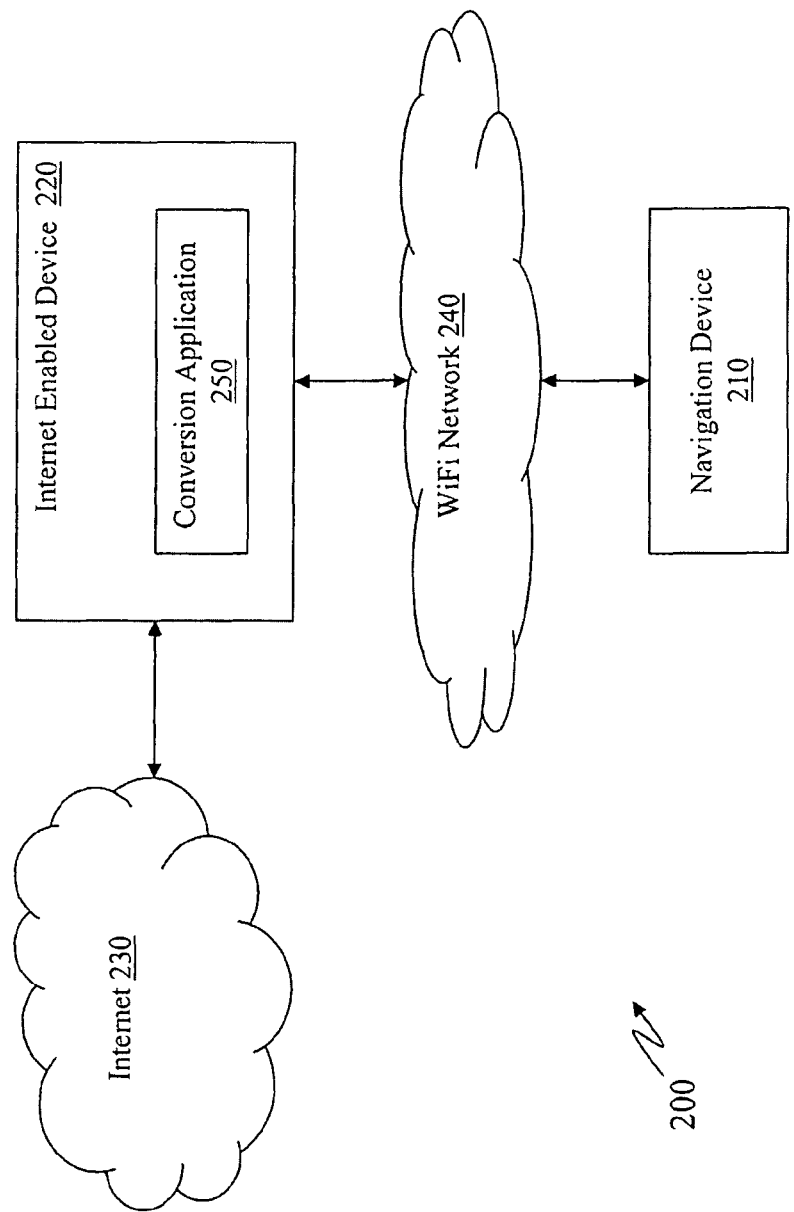
FIG. 2 illustrates a block diagram of a system for transferring contact data to a navigation device in accordance with exemplary embodiments.

FIG. 2 is a block diagram of a system 200 for transferring contact data to a navigation device 210. In the system 200, an Internet enabled device 220 is operatively connected to an Internet 230 (which may be the same or similar to the network 120) for transmitting and receiving various communications. The Internet enabled device 220 communicates with the navigation device 210, e.g., via a WiFi network 240.

The navigation device 210 may have WiFi capabilities for communicating over the WiFi network 240, including hardware and software for providing WiFi capabilities, which should be familiar to those skilled in the art. Also, the navigation device 210 may have guidance and positioning capabilities (e.g., GPS) for locating a particular place, which should be familiar to those skilled in the art.

As non-limiting examples, an access point for providing connectivity to the WiFi network 240 may be located in a house, while the navigation device 210 may be in a vehicle that is located in a garage of the house, and the Internet enabled device 220 may be located in the house. Both the navigation device 210 and the Internet enabled device 220 can wirelessly access the access point of the WiFi network 240 for communicating in accordance with exemplary embodiments.

In exemplary embodiments, a user of the Internet enabled device 220 may search for a webpage (e.g., hosted by the server 125), such as the YELLOW PAGES™ (Yellowpages.com), that provides the location (which may be an address or waypoint information) of a particular place or point of interest. The user of the Internet enabled device 220 can retrieve (e.g., download, cut and paste, select, etc.) the location from the webpage. In accordance with exemplary embodiments, a conversion application 250 on the Internet enabled device 220 can convert the location from the webpage into a format that is acceptable to the navigation device 210. As a non-limiting example, the Internet enabled device 220 may be an IPTV device (such as the communication device 105) in communication with a set top box (e.g., the set top box 110) capable of performing IPTV services.

In exemplary embodiments, the conversion application 250 may determine that the location (i.e., the address or waypoint information) is downloaded from the webpage in an XML format. The conversion application 250 may parse the location information to recognize the XML format. The conversion application 250 may also determine that the location information is currently in a suitable format (such as a format discussed below). In response to determining the format of the location information, the conversion application 250 may reformat the location information in accordance with, e.g., the GARMIN™ protocol (which is a well-known standard for positioning and guidance systems), or e.g., the GPSBabel format (which is a cross-platform, open source program to transfer routes, tracks, and waypoint data to and from consumer GPS units, and to convert between many types of GPS data formats). The conversion application 250 may convert the location information in accordance with many various standards and formats such as DELORME, STREETS AND TRIPS, MAGELLAN, etc. It is understood that the conversion application 250 may receive the location information in and convert the location to many different formats as known in the art, and it is understood that the conversion application 250 is not meant to be limited to a particular format.

In exemplary embodiments, the conversion application 250 may extract the location information from the webpage such as the address information, waypoint information, name (e.g., of the business or person), and the like. The extracted information can be transferred from the Internet enabled device 220 to the navigation device 210 in accordance with the proper format. Additionally, the waypoint information may be a set of coordinates that identify a point in physical space. These coordinates usually include longitude and latitude, and sometimes altitude.

According to exemplary embodiments, the Internet enabled device 220 transfers the location information, which may be reformatted by the conversion application 250 if needed, to the navigation device 210 via the WiFi network 240. With the location information, the navigation device 210 is able to navigate to the particular location. Also, the location information may be stored on the navigation device 210 and be retrieved later.

As a non-limiting example, the navigation device 210 may be installed in a vehicle that is located in the garage, and the Internet enabled device 250 may be in the home. Both the navigation device 210 and the Internet enabled device 250 are within range of a wireless access point of the WiFi network 240 for transmitting and receiving communications.

Figure 3:
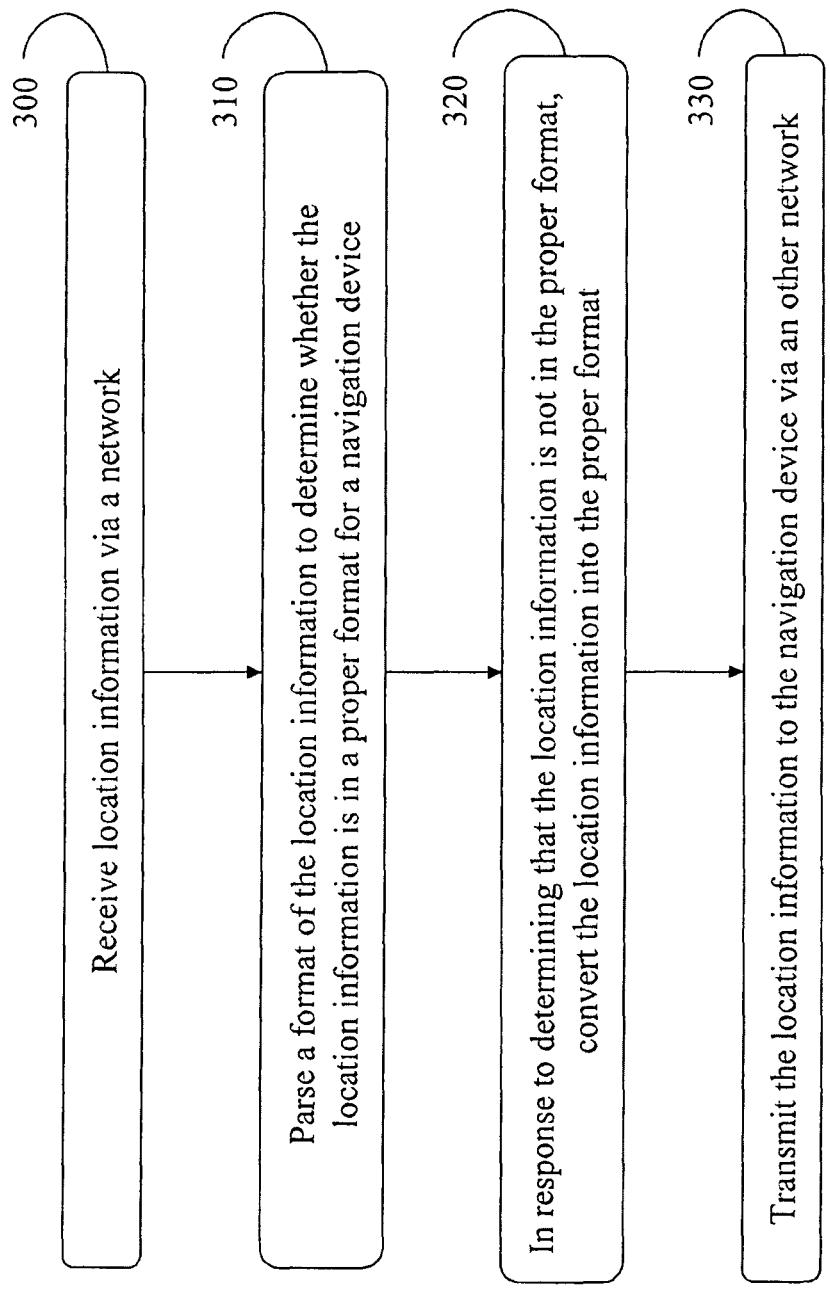
FIG. 3 illustrates a method for transferring location information from an Internet enabled device to a navigation device in accordance with exemplary embodiments.

FIG. 3 illustrates a method for transferring location information from the Internet enabled device 220 to the navigation device 210 in accordance with an exemplary embodiment. A user may retrieve location information such as address or waypoint information from a webpage (e.g., YELLOW PAGES™) using the Internet enabled device 220 at 300. A conversion application, such as the conversion application 250, parses the location information to determine whether the location information is in a suitable format for the navigation device 210 at 310. As a non-limiting example, it may be determined that the location information is in an XML format, and the conversion application 250 converts the location information in accordance with the GARMIN™ protocol at 320. The Internet enabled device 220 transmits the location information (which may or may not be reformatted by the conversion application 250) to the navigation device 210 via the WiFi network 240 at 330. A user may request that the location information be transmitted, or the Internet enabled device 220 may automatically transmit the location information. Further, in exemplary embodiments, the conversion application 250 may obtain the location information by extracting the address, waypoints, and name of the business from, e.g., the YELLOW PAGES™ website using the Internet enabled device 220.

Figure 4:
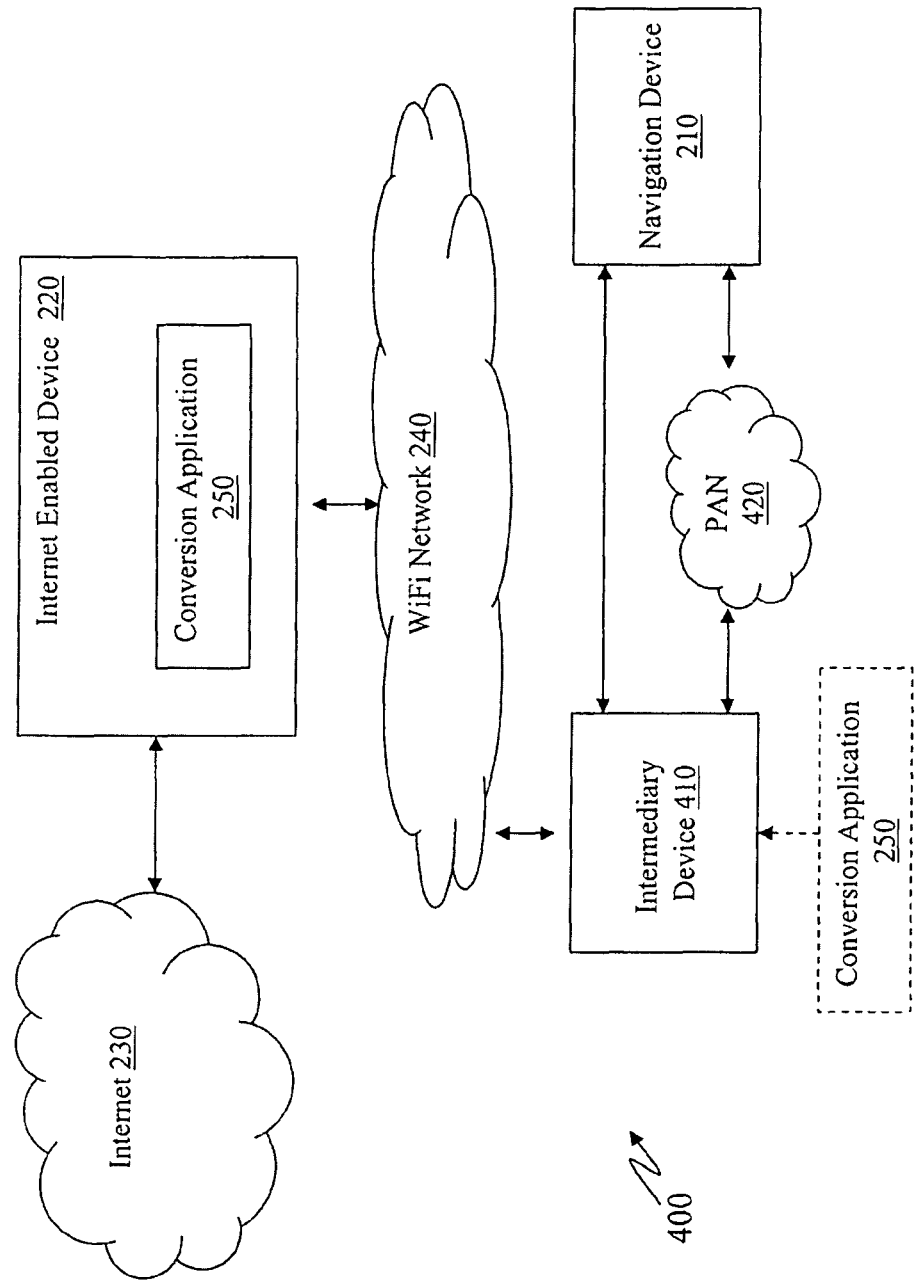
FIG. 4 illustrates a block diagram of a system in accordance with exemplary embodiments.

FIG. 4 illustrates a block diagram of a system 400 in accordance with an embodiment similar to that shown in FIG. 2. The system 400 may be similar to the system 200. The system 400 includes the Internet 230 and the WiFi network 240. In the system 400, the Internet enabled device 220 may or may not comprise the conversion application 250. An intermediary device 410 may comprise the conversion application 250.

In accordance with exemplary embodiments, the intermediary device 410 may be operatively connected to the Internet enabled device 220 via the WiFi network 240. In exemplary embodiments, the intermediary device 410 may be operatively connected to the navigation device 210 via a personal area network (PAN) 420. As a non-limiting example, the PAN 420 can support communications using BLUETOOTH technology. In exemplary embodiments, the intermediary device 410 may be operatively connected to the navigation device 210 via a direct connection, such as a serial plug, a USB connection, or any other type of interface for connecting positional and guidance devices. The direct connection may be, e.g., a type of connection that those skilled in the art would recognize as being capable of connecting guidance and positional devices. In the system 400, a non-limiting example is illustrated in which the navigation device 210 may or may not possess WiFi capabilities. According to exemplary embodiments, the intermediary device 410 is compatible with legacy guidance and positional devices that may not have WiFi capabilities.

The intermediary device 410 may contain all the hardware and software for communicating over the WiFi network 240 and the PAN 420 and for interfacing with the navigation device 210. The navigation device 210 may also contain all the hardware and software for communicating over the PAN 420.

As discussed herein, a user may retrieve location information such as address or waypoint information from a webpage (e.g., YELLOW PAGES™) using the Internet enabled device 220. The Internet enabled device 220 extracts and transfers the location information to the intermediary device 410 via the WiFi network 240. As a non-limiting example, the Internet enabled device 220 may not include the conversion application 250, and the intermediary device 410 may include the conversion application 250. If the conversion application 250 determines that the location information is not in the proper format, the conversion application 250 converts the location information to a format that is suitable for the navigation device 210 (e.g., in accordance with the GARMIN™ protocol).

In exemplary embodiments, the intermediary device 410 transfers the location information to the navigation device 210. The location information may be transferred from the intermediary device 410 to the navigation device 210 via the PAN 420 and/or a direct connection. After receiving the location information, the navigation device 210 can navigate to the particular location or store the location information.

As a non-limiting example, the intermediary device 410 may be in a vehicle that is located in the garage, and the Internet enabled device 250 may be in the home. The intermediary device 410 may be installed in the vehicle, or the intermediary device 410 may be a mobile device that can be brought into the vehicle as needed. According to exemplary embodiments, both the intermediary device 410 and the Internet enabled device 250 are within range of a wireless access point of the WiFi network 240 for transmitting and receiving communications. The intermediary device 410 and the navigation device 210 are in proximity to communicate over the PAN 420. For example, the intermediary device 410 and the navigation device 210 may utilize BLUETOOTH technology to communicate with one another over the PAN 420.

Figure 5:
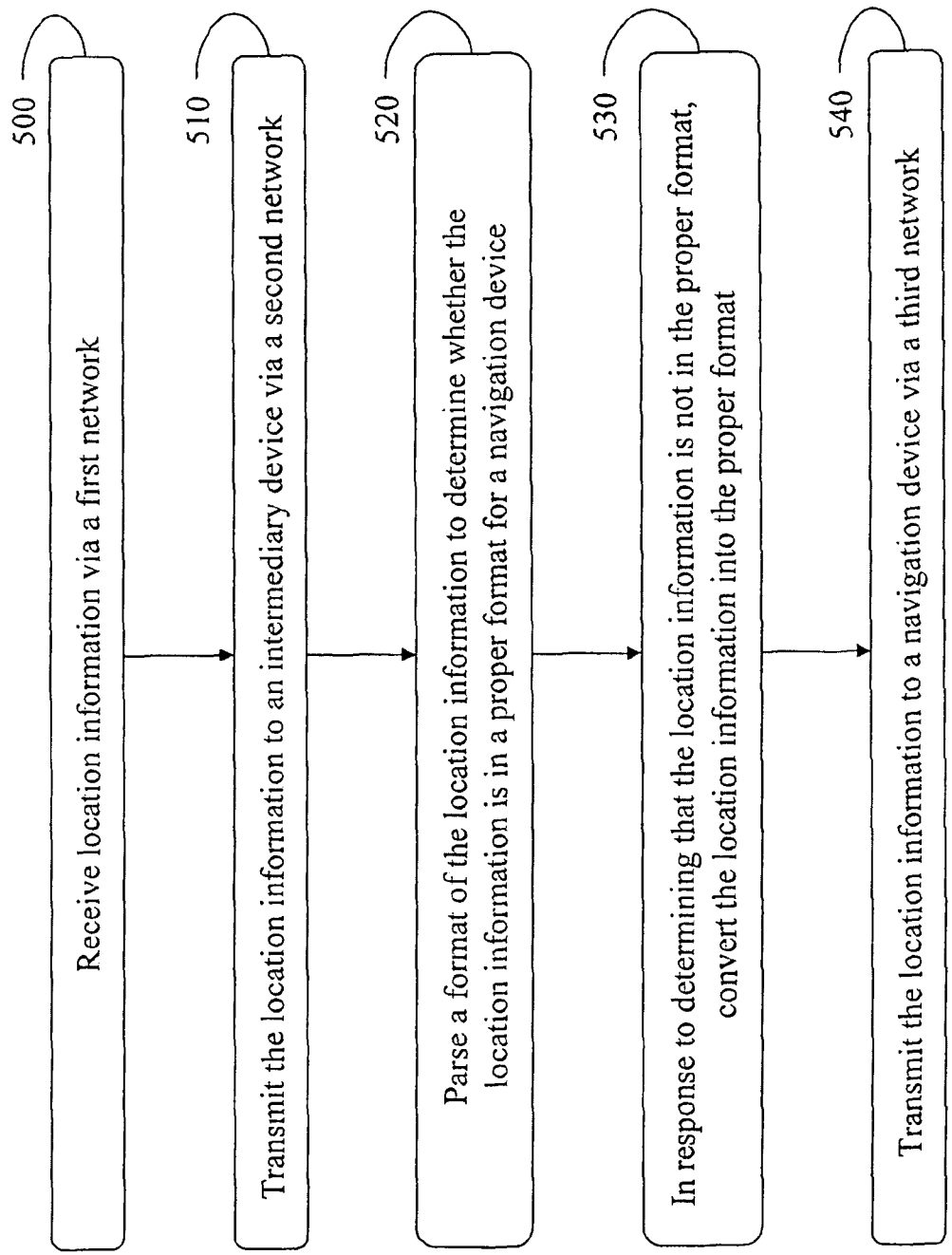
FIG. 5 illustrates a method for transferring location information from an Internet enabled device to a navigation device via an intermediary device in accordance with exemplary embodiments.

FIG. 5 illustrates a method for transferring location information from the Internet enabled device 220 to the navigation device 210 via the intermediary device 410 in accordance with an exemplary embodiment.

As discussed herein, a user may retrieve location information such as address or waypoint information from a webpage (e.g., YELLOW PAGES™) over the Internet 230 using the Internet enabled device 220 at 500. The Internet enabled device 220 transfers the location information to the intermediary device 410 over a network, such as the WiFi network 240 at 510. The user may request that the location information be transferred and/or the Internet enabled device 220 may automatically transfer the location information to the intermediary device 410. As a non-limiting example, the Internet enabled device 220 may extract from a webpage the name, address, and waypoints related to a particular business. The conversion application 250 (e.g., residing on the intermediary device 410 and/or the Internet enabled device 230) parses the location information to determine whether the location information is in a suitable format for the navigation device 210 at 520. As a non-limiting example, it may be determined that the location information is in an XML format, and the conversion application 250 converts the location information to the proper format (e.g., in accordance with the GARMIN™ protocol) at 530. The intermediary device 410 transmits the location information (which may or may not be reformatted by the conversion application 250) to the navigation device 210 via the PAN 420 at 540.

Figure 6:
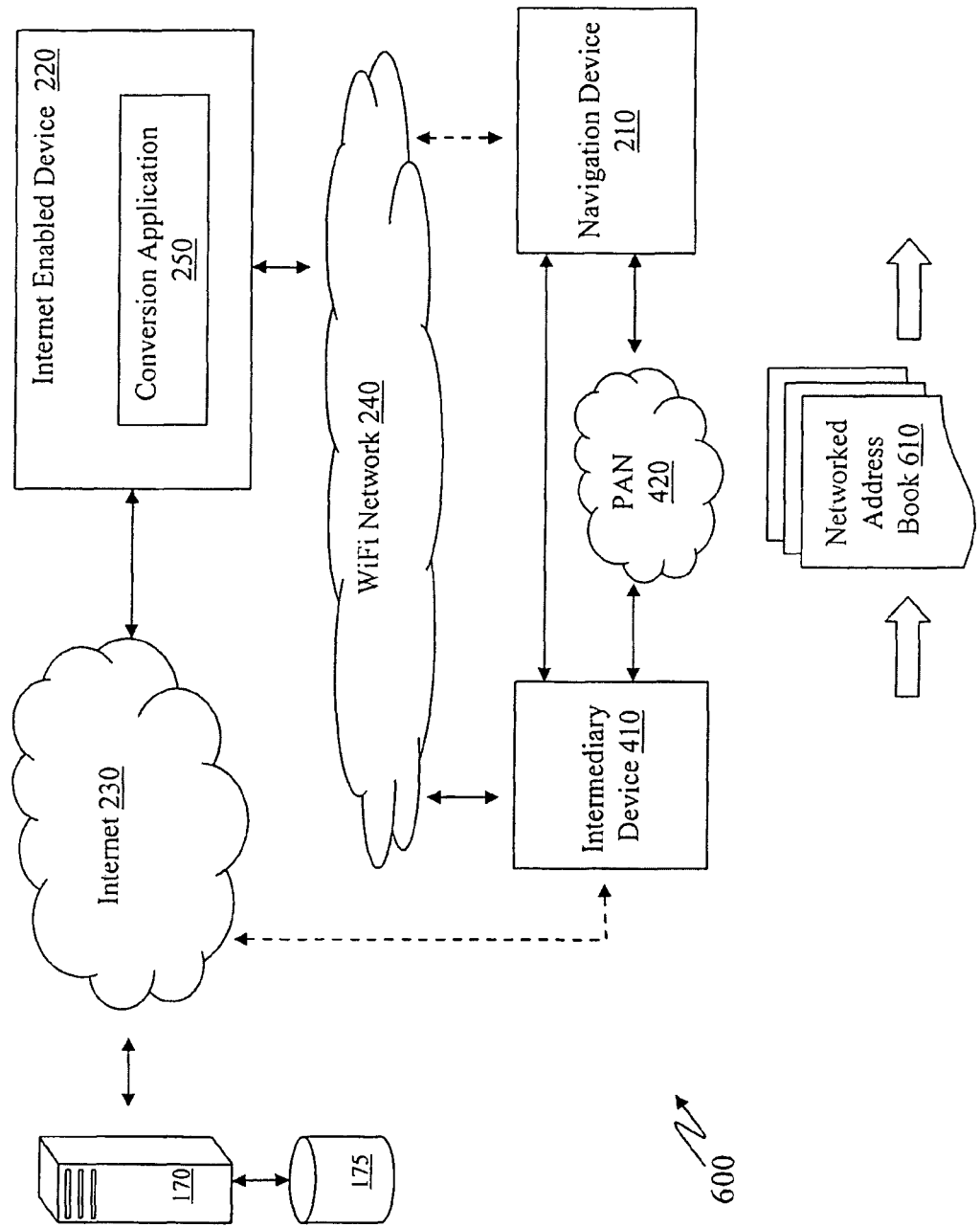
FIG. 6 illustrates a block diagram of a system for transferring entries of a networked address book in accordance with exemplary embodiments.

FIG. 6 is a block diagram of a system 600 for transferring entries of a networked address book 610 in accordance with another exemplary embodiment. The server 170 and the storage device 175 are operatively connected to the Internet 230. According to exemplary embodiments, the networked address book 610 is stored on and accessible from the server 170 and the storage device 175. A service provider may maintain services for the networked address book 610. The service provider can control access by the server 170 and the storage device 175 to the address book 610. The entries of the networked address book 610 may contain names, addresses, telephone numbers, waypoints, annotations, etc. Further, the networked address book 610 may contain maps, advertisement (i.e., commercial) information, etc.

In exemplary embodiments, a user of the Internet enabled device 220 can access the networked address book 610 over the Internet 230 by communicating with the server 170. Although the Internet 230 has been used as a network in non-limiting examples, exemplary embodiments are not limited to the Internet 230. The networked address book 610 may be parsed by the conversion application 250 (e.g., residing on the Internet enabled device 220 and/or the intermediary device 410) to determine the format of data contained in the network address book 610. As a non-limiting example, the entries of the networked address book 610 may be in an XML format, and the conversion application 250 can convert the entries of the networked address book 610 into a format that is suitable (e.g., in accordance with the GARMIN™ protocol) for the navigation device 210. The networked address book 610 may be transferred from the Internet enabled device 220 over the WiFi network 240 to the intermediary device 410. If, for example, the networked address book 610 were not converted, the conversion application 250 residing on the intermediary device 410 can convert the networked address book 610 into the proper format for the navigation device 210. The intermediary device 410 transfers the networked address book 610 to the navigation device 210 via the PAN 420 or via a direct connection (such as a USB or serial connection).

In exemplary embodiments, the navigation device 210 may be capable of receiving the networked address book 610 from the Internet enabled device 220 via the WiFi network 240, without the assistance of the intermediary device 410.

In exemplary embodiments, the intermediary device 410 may be operatively connected to the Internet 230 or another network and may be configured to communicate on the Internet 230. The intermediary device 410 may access the server 170 (or the storage device 175) to retrieve the networked address book 610. As discussed herein, the intermediary device 410 may include the conversion application 250 and convert (if necessary) the networked address book 610 into the proper format for the navigation device 210.

In accordance with exemplary embodiments, the networked address book 610 may be transferred in bulk at one time, or the networked address book may be transferred entry by entry. Also, multiple entries may be transferred from time to time. An entry may be a contact for a particular person or business, and the entry may include various information regarding the person or business. Depending on whether the navigation device 210 or the intermediary device 410 supports bulk or single entry transfer, the networked address book 610 is transferred accordingly. As a non-limiting example, the navigation device 210 may support no more than ten entries being transmitted at one time, or the transfer of entries may be based on the size of each entry being transmitted to the navigation device 210. Also, the conversion application 250 can parse the entries of the networked address book 610 and can extract the information that is acceptable to the navigation device 210. As a non-limiting example, an entry in the networked address book 610 may include various data about that entry, such as the name, address, waypoints, telephone number, and notes. The conversion application 250 may extract the address, waypoints, and name for the entry, and transfer this information to the navigation device 210, because the navigation device 210 (i.e., the database of the navigation device 210) may not have a field for telephone numbers and other notes. Conversely, if the navigation device 210 contains a data structure that supports other information, like telephone numbers, notes, etc., the conversion application 250 may format the entries of the networked address book 610 in accordance with the data structure of the navigation device 210, so that the other information is available to the user.

Figure 7:
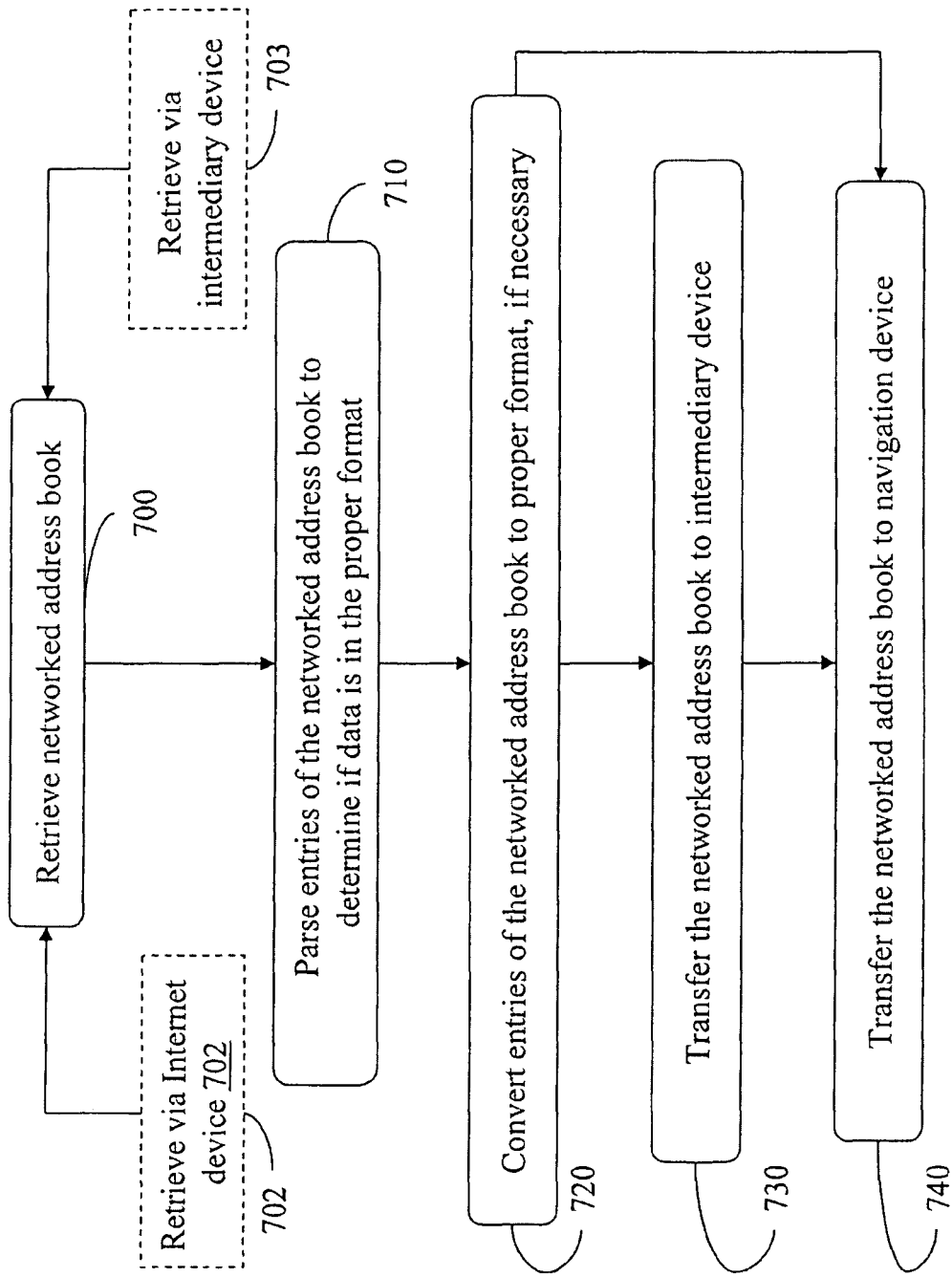
FIG. 7 illustrates a method for transferring entries of a networked address book to a navigation device in accordance with exemplary embodiments.

FIG. 7 illustrates a method for transferring entries of the networked address book 610 to the navigation device 210 in accordance with an exemplary embodiment. The networked address book (or one or more entries in the address book) 610 may be retrieved from, e.g., the server 170 or the storage device 175 at 700. As non-limiting examples, entries in the networked address book 610 may be retrieved by the Internet enabled device 220 at 702 or the intermediary device 410 at 703. Data of the entries in the networked address book 610 is parsed to determine if the data is in a format that is suitable for the navigation device 210 at 710. If necessary, the conversion application 250 can convert the data of the networked address book 610 into the proper format at 720. The entries in the networked address book 610 may be transferred to the navigation device 210 at 740. Alternatively, in exemplary embodiments, the entries in the networked address book 610 may be transferred to the intermediary device 410 at 730, and the intermediary device 410 may transfer entries in the networked address book 610 to the navigation device 210 at 740.

Figure 8:
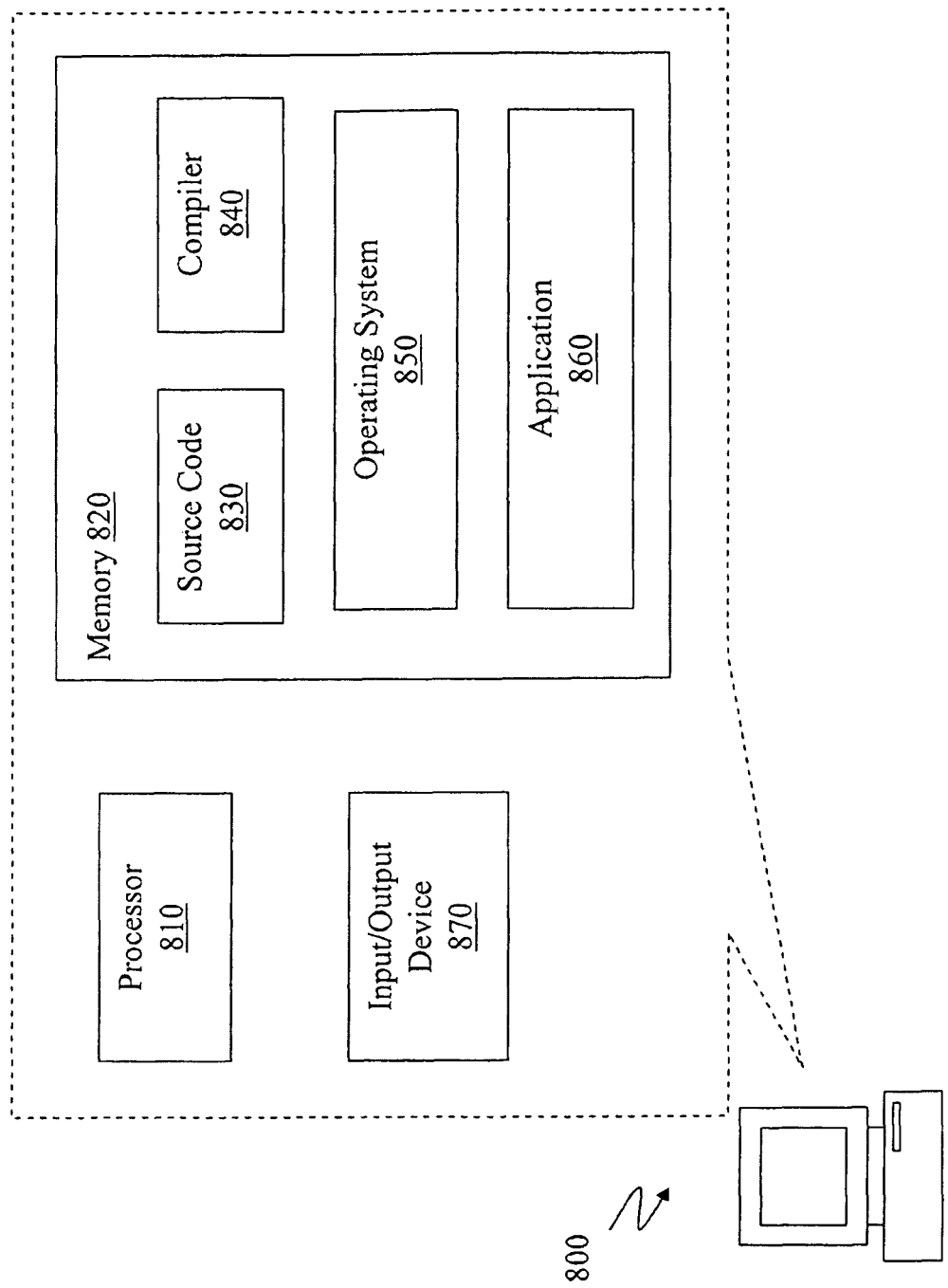
FIG. 8 illustrates an example of a computer having capabilities that may be included in exemplary embodiments.

FIG. 8 illustrates an example of a computer 800 having capabilities, which may be included in exemplary embodiments. Various methods and systems discussed above may also utilize the capabilities of the computer 800. One or more of the capabilities of the computer 800 may be incorporated in the Internet enabled device 220, the navigation device 210, the set top box 110, the intermediary device 410, the servers 115, 125, 130, 170, and/or any element discussed herein.

The computer 800 includes, but is not limited to, PCs, workstations, positional and/or guidance devices, laptops, PDAs, palm devices, Internet protocol enabled televisions, set top boxes, servers, and the like. Generally, in terms of hardware architecture, the computer 800 may include one or more processors 810, memory 820, and one or more input and/or output (I/O) devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a data signal processor (DSP), or an auxiliary processor among several processors associated with the computer 800, and the processor 810 may be a semiconductor based microprocessor (in the form of a microchip) or a macroprocessor.

The memory 820 can include any one or combination of volatile memory elements (e.g., random access memory ((RAM)), such as dynamic random access memory (DRAM), static random access memory ((SRAM)), etc.) and nonvolatile memory elements (e.g., ROM, erasable programmable read only memory ((EPROM)), electronically erasable programmable read only memory ((EEPROM)), programmable read only memory ((PROM)), tape, compact disc read only memory ((CD-ROM)), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and an application 860 (which may be one or more applications) of the exemplary embodiments. As illustrated, the application 860 comprises numerous functional components for implementing the features and operations of the exemplary embodiments. The application 860 of the computer 800 may represent the various applications referred to herein, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments is applicable on all other commercially available operating systems.

The application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 1350. Furthermore, the application 860 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 870 may include input devices such as, for example but not limited to, a mouse, keyboard, scanner, microphone, camera, etc. Furthermore, the I/O devices 870 may also include output devices, for example but not limited to, a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such at the Internet 230, the WiFi network 240, the PAN 420, and the networks 120, 121.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 860 is implemented in hardware, the application 860 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 800 includes non-limiting examples of software and hardware components that may be included in various devices and systems discussed herein, and it is understood that additional software and hardware components may be included in the various devices and systems discussed in exemplary embodiments.

Communication devices, networks, systems, Internet devices, PCs, PDAs, mobile devices, communication vehicle devices, servers, set top boxes, guidance systems, navigational devices, positioning/location systems, etc., comprise all the hardware, software, modules, applications, and interfaces necessary to operate and function as described herein.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for transferring location information, comprising:
   receiving a network address book comprising the location information by a communication vehicle device via a wireless network from a television, wherein the location information is in the network address book, wherein the network address book is stored on a different network, and wherein the communication vehicle device is installed in a vehicle;
   parsing the location information;
   determining by the communication vehicle device in the vehicle whether the location information received from the television is in a proper format for a navigation device;
   the communication vehicle device determining that the location information is received in the proper format from the television, responsive to the television converting the location information into the proper format for the navigation device;
   in response to determining that the location information is not in the proper format by the communication vehicle device, converting by the communication vehicle device the location information into the proper format for the navigation device; and
   transmitting by the communication vehicle device the location information to the navigation device installed in the vehicle via an other network, wherein the navigation device is capable of receiving communications over the other network.

2. The method of claim 1, wherein the television is an internet enabled device connected to the communication vehicle device that receives the location information via the wireless network.

3. The method of claim 1, wherein the network address book stored on the network comprises annotations, names, addresses, telephone numbers, waypoints, maps, and advertisements.

4. The method of claim 1, wherein the different network is a personal area network.

5. The method of claim 1, wherein the location information is an address.

6. The method of claim 1, wherein the location information is waypoints having a latitude and a longitude.

7. The method of claim 1, wherein the communication vehicle device receives the location in the proper format when an application of the television parses a format of the location information, determines whether the location information is in the proper format for the navigation device, and converts the location information to the proper format of the navigation device.

8. An apparatus for transferring location information to a navigation device, the apparatus comprising:
   a communication vehicle device including:
   memory for storing a conversion application;
   an input and output component for respectively receiving and transmitting communications, wherein the input and output component of the communication vehicle device receives a network address book comprising the location information from a television over a wireless network, wherein the location information is in the network address book, wherein the network address book is stored on a different network, and wherein the communication vehicle device is installed in a vehicle; and
   a processor, functionally coupled to the memory, the processor being responsive to computer-executable instructions contained in the conversion application and operative to:
   parse the location information received by the communication vehicle device,
   determine whether the location information received by the communication vehicle device from the television is in a proper format for the navigation device,
   wherein the processor determines that the location information is received in the proper format from the television, responsive to the television converting the location information into the proper format for the navigation device, and
   in response to the location information not being in the proper format, convert the location information into the proper format for the navigation device,
   wherein the communication vehicle device is operatively connected to the navigation device installed in the vehicle via an other network, and transfers the location information to the navigation device via the other network.

9. The apparatus of claim 8, wherein the communication vehicle device is an internet enabled device.

10. The apparatus of claim 8, wherein the different network is a personal area network.

11. The apparatus of claim 8, wherein the location information is an address, and waypoints having a latitude and a longitude.

12. A method for transferring location information by a television, comprising:
    receiving the location information by the television via a wireless network;
    parsing the location information;
    determining by the television whether the location information is in a proper format for a navigation device;
    converting by the television the location information to the proper format for the navigation device; and
    transmitting by the television the location information to the navigation device.

13. The method of claim 12, wherein the location information comprises waypoints having a latitude and a longitude.

14. The method of claim 12, wherein the location information is an address.

15. A method of synchronizing a networked address book for transfer to a navigation device, comprising:
    receiving by a television the networked address book via a wireless network, wherein the networked address book comprises names, addresses, and contact numbers, and wherein the network address book is stored on a different network;
    parsing by the television entries of the networked address book to determine if data of the networked address book is in a proper format for the navigation device installed in a vehicle;
    converting by the television the entries of the networked address book to the proper format, in response to determining that the entries are not in the proper format; and
    transferring by the television the entries of the networked address book to the navigation device.

16. The method of claim 15, wherein the entries of the networked address book are transferred by the television one at a time to the navigation device.

17. The method of claim 15, wherein the entries of the networked address book are converted from extensible markup language to a format based on a protocol.

18. The method of claim 15, further comprising extracting by the television address information from the networked address book; and transferring by the television the address information extracted to the navigation device.

19. The method of claim 15, further comprising extracting waypoint information from the networked address book; and transferring the waypoint information extracted to the navigation device.

\* \* \* \* \*